UNITED STATES PATENT OFFICE.

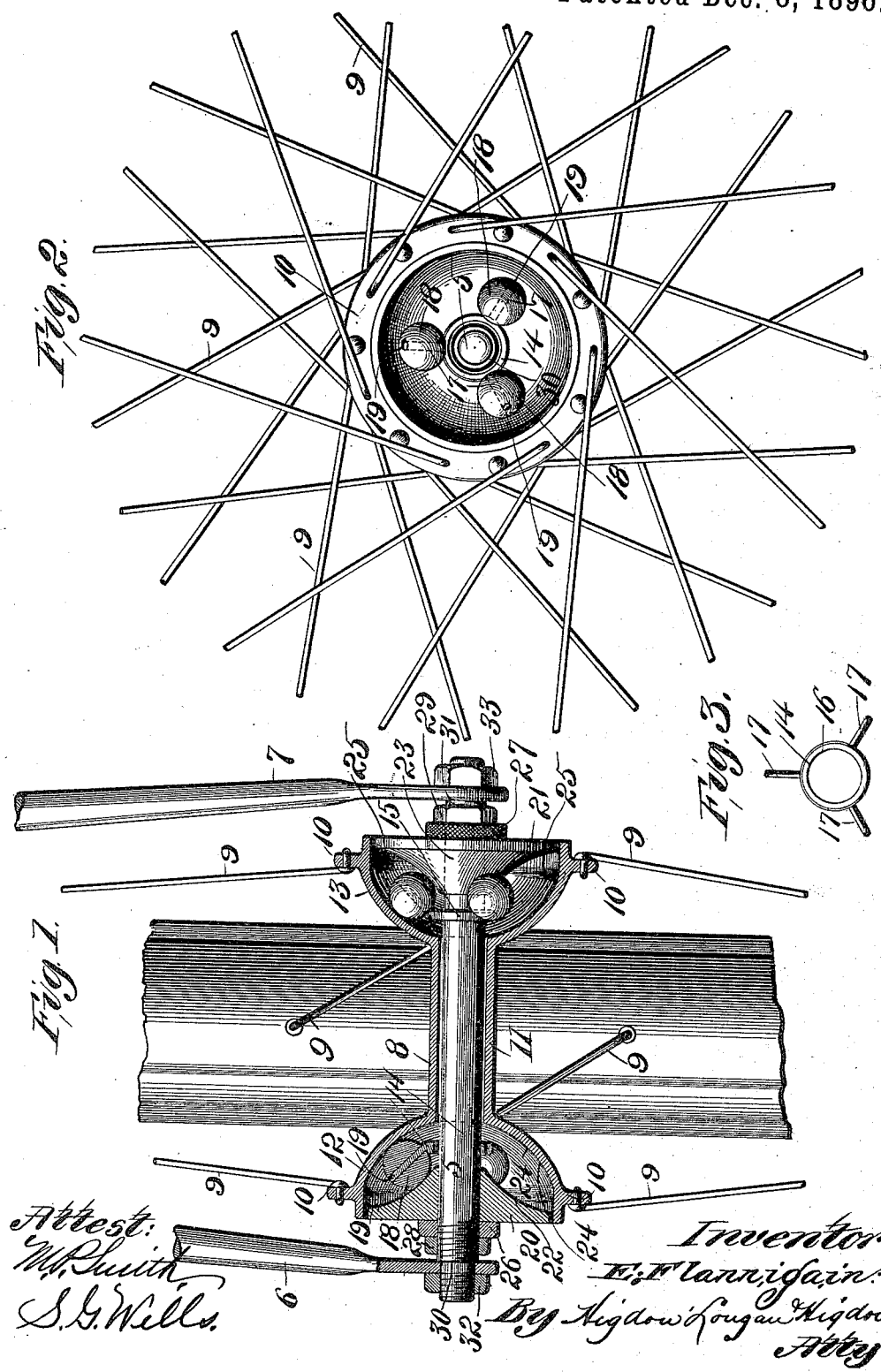

EDWARD FLANNIGAIN, OF ST. LOUIS, MISSOURI, ASSIGNOR OF ONE-HALF TO FRANK W. KLOCKE, OF SAME PLACE.

BALL-BEARING.

SPECIFICATION forming part of Letters Patent No. 572,880, dated December 8, 1896.

Application filed July 20, 1896. Serial No. 599,950. (No model.)

*To all whom it may concern:*

Be it known that I, EDWARD FLANNIGAIN, of the city of St. Louis, State of Missouri, have invented certain new and useful Improvements in Ball-Bearings, of which the following is a full, clear, and exact description, reference being had to the accompanying drawings, forming a part hereof.

My invention relates to ball-bearings; and it consists in the novel construction, combination, and arrangement of parts hereinafter shown, described, and claimed.

Figure 1 is a sectional view through the hub of the front wheel of a bicycle and illustrating the application of my invention thereto. Fig. 2 is a side elevation of a part of a bicycle-wheel, showing an end view of the hub with the cone of the bearing removed. Fig. 3 is a plan view of the spider upon which the balls of my improved bearing are journaled.

Referring to Fig. 1, the shaft or axle 5 connects the free ends 6 and 7 of the front fork of the bicycle-frame and passes through the hub 8 of the front wheel of the bicycle, and the spokes 9 are attached to the flanges 10 of the hub in the usual way. The hub 8 of the wheel consists of the tube 11, which fits loosely upon the center of the shaft 5. A hemispherical cup 12 is formed integral with one end of the tube 11, and a hemispherical cup 13 is formed integral with the opposite end of said tube 11. The spider 14 is placed upon the shaft 5 within the cup 12, and the spider 15 is placed upon the shaft 5 within the cup 13. The spiders 14 and 15 are essentially alike and are constructed as shown in Fig. 3, and each consists of a ring 16 and the arms 17, projecting from said ring. The arms 17 extend radially from the ring 16 and at angles between the horizontal and vertical. The rings 16 are placed loosely upon the shaft 5, and the bearing-balls 18, having the central bores 19, are placed against the inner surfaces of the cups, with the arms 17 in said bores 19. The cones 20 and 21 are then placed upon the ends of the shaft 5 and against the bearing-balls 18. The cones 20 and 21 are essentially alike, and the surfaces 22 and 23 of said cones, against which the bearing-balls 18 operate, are slightly concaved and are concentric relative to the shaft 5. The inner surfaces 24 and 25 of the cups 12 and 13, and against which the bearing-balls 18 operate, are also concentric relative to the shaft 5.

The nut 26 is placed upon one end of the shaft 5 and against the outer surface of the cone 20, and a similar nut 27 is placed upon the opposite end of the shaft 5 and against the outer surface of the cone 21. A jam-nut 28 is placed upon the end of the shaft 5 and against the nut 26, and a second jam-nut 29 is placed upon the other end of the shaft 5 and against the nut 27. The end 6 of the fork of the bicycle-frame is placed upon the end of the shaft 5 and against the shoulder 30, which shoulder is outside of the jam-nut 28. The end 7 of the fork is placed upon the opposite end of the shaft 5 and against the shoulder 31, which is outside of the jam-nut 29. A nut 32 is then placed upon the extreme outer end of the shaft 5 and against the end 6 of the bicycle-frame, and a similar nut 33 is placed upon the opposite end of said shaft 5 and against the end 7 of the fork of the bicycle-frame.

The bearing may be shifted upon the shaft 5 by the operation of the nuts 26, 27, 28, and 29, and said bearing may be adjusted to take up the slack motion caused by wearing of the parts by manipulation of either the nuts 26 and 28 or the nuts 27 and 29.

The feature of my invention to which I wish to call especial attention is the use of the spider shown in Fig. 3, upon which the bearing-balls are mounted. The object of this spider is to hold the balls apart and to keep them arranged radially around the shaft of the bearing, and by this construction the bearing requires a small number of balls and the friction caused by the rubbing of the balls together is avoided.

Another important feature of my invention consists in mounting the cones for rotation upon the shaft. This feature is valuable as a safety device should the bearing stick for any reason, such as the breaking of the balls. The cones will readily rotate upon the shaft and the wheel may continue to run for some time without injury to the parts.

A ball-bearing of my improved construction possesses many other advantages over those heretofore in use which will readily suggest themselves to those familiar with the construction of ball-bearings.

While I have shown my invention in connection with a bicycle-wheel, it is obvious that it may be used in any device in which a ball-bearing would be advantageous.

I claim—

1. A ball-bearing consisting of the shaft 5, the tube 11 mounted loosely upon said shaft, the hemispherical cups 12 and 13 formed integral with the ends of said tube 11, the spiders 14 and 15 upon the shaft 5 and within the cups 12 and 13, respectively; each of said spiders consisting of the ring 16 and the arms 17 formed integral with said ring; the bearing-balls 18 mounted upon said arms 17, the cones 20 and 21 mounted upon the ends of said shaft and against the bearing-balls 18, said cones having concaved annular surfaces 22 and 23 respectively, against which said bearing-balls operate, and means of holding said cones and said tube adjustably in position, substantially as specified.

2. A ball-bearing consisting of the shaft 5, the tube 11 mounted loosely upon said shaft, the hemispherical cups 12 and 13 formed integral with the ends of said tube 11, the spiders 14 and 15 upon the shaft 5 and within said cups 12 and 13 respectively; each of said spiders consisting of the ring 16 and the arms 17 formed integral with said ring; the bearing-balls 18 mounted upon said arms 17, the cones 20 and 21 mounted upon the ends of said shaft and against the bearing-balls 18, said cones having concaved annular surfaces 22 and 23 respectively, against which said bearing-balls operate, and means of holding said cones and said tube adjustably in position; which means consists of the nuts 26 and 27, one upon each end of said shaft and outside of said cones, and the jam-nuts 28 and 29, one upon each end of said shaft and outside of said nuts 26 and 27, substantially as specified.

In testimony whereof I affix my signature in presence of two witnesses.

EDWARD FLANNIGAIN.

Witnesses:
EDWARD E. LONGAN,
S. G. WELLS.